United States Patent [19]

Born

[11] Patent Number: 5,365,497

[45] Date of Patent: Nov. 15, 1994

[54] SILENT ELECTROMAGNETIC ALARM

[75] Inventor: Jean-Jacques Born, Morges, Switzerland

[73] Assignee: Asulab S.A., Bienne, Switzerland

[21] Appl. No.: 238,024

[22] Filed: May 3, 1994

[30] Foreign Application Priority Data

May 18, 1993 [CH] Switzerland ............... 01 512/93-5

[51] Int. Cl.$^5$ ...................... G04B 19/06; G04C 21/00
[52] U.S. Cl. .................................. 368/230; 368/250
[58] Field of Search .................. 368/76, 86, 88, 160, 368/239, 243, 244, 250, 276; 340/407

[56] References Cited

U.S. PATENT DOCUMENTS

| | | | |
|---|---|---|---|
| 4,637,732 | 1/1987 | Jenes et al. | 368/109 |
| 4,920,525 | 4/1990 | Meister | 368/250 |
| 5,023,853 | 6/1991 | Kawata et al. | 368/230 |

FOREIGN PATENT DOCUMENTS

| | | |
|---|---|---|
| 0349230 | 1/1990 | European Pat. Off. . |
| 0437033 | 7/1991 | European Pat. Off. . |
| 2182600 | 12/1973 | France . |

OTHER PUBLICATIONS

JP-A-60 089 791, Seikoushiya K.K., Patent Abstracts of Japan, vol. 009, No. 236 (P-390), 21 Sep. 1985.

Primary Examiner—Vit W. Miska
Attorney, Agent, or Firm—Pollock, Vande Sande & Priddy

[57] ABSTRACT

A non-acoustic alarm intended to equip a device supplying information such as time information. Such alarm includes motor means (24) which can be electrically driven and which are associated with a mass (26) adapted to be set in motion under the action of the motor means (24) in order to furnish a vibratory effect. Such alarm is furthermore characterized in that the motor means (24) are constituted by an electromagnetic motor (24a, 24b) fixedly mounted on a support (28) including elastic coupling elements (30) which are associated with said mass (26) which is designed to assume a quasi-linear oscillating motion relative to the electromagnetic motor (24a, 24b) when the motor is operated. The invention is particularly adapted for integration within a timepiece.

17 Claims, 3 Drawing Sheets

SILENT ELECTROMAGNETIC ALARM

The present invention concerns a silent or non-acoustic alarm and more specifically a silent alarm intended to equip a device supplying information such as time information.

The invention is thus especially adapted to be integrated into a timepiece of small thickness or into an arrangement also of small dimensions for searching persons which is referred to under the denomination "pager" and which is designed in order to be worn on the arm of a user.

BACKGROUND OF THE INVENTION

Known alarms, whether they be those which equip timepieces furnishing basic time information or those which equip personal searching devices are designed to signal a specific event such as an alarm time or a radio-telephone call by furnishing a selected sound within a range or according to a specific tonality.

This type of alarm exhibits the basic drawback of being perceptible in the surroundings of the user which, in the alarm function, does not enable distinguishing the user from other persons. Furthermore, in its application to a searching device for persons (pager), this type of acoustic alarm informs all persons present, for example during a work conference, at the same time as the user of the call received by such user.

Thus, it is understood that this type of acoustic alarm exhibits a drawback of not being discreet and that in being perceptible to persons other than the user, it does not enable easy differentiation of one of the users in a group of other persons.

To overcome this, silent, non-acoustic alarms have been proposed which include motor means driving a mass designed in a manner such that during its displacement such mass furnishes a vibratory effect which can be transmitted to the user. The vibration perceptible by such user thus warns him and him alone of the alarm time or the call received.

A non-acoustic alarm of this type is described in the patent application EP 0 349 230. Such alarm includes a piezo-electric motor which drives in rotation an eccentric mass movably mounted on a spindle.

Because of the coaxial configuration of this arrangement, the latter exhibits a relatively substantial space requirement in thickness, so that it necessitates a specific layout in order to be mounted in a timepiece, indeed a complete redesign of such timepiece.

Furthermore, such arrangement necessitates providing a piezo-electric motor the manufacture of which calls on relatively complex techniques. Additionally, it is known that piezo-electric motors operate on the friction principle and that they undergo substantial wear and thus have a limited life duration.

Finally, this arrangement requires an extremely precise assembly of the mass on its spindle which it stresses highly because of the vibratory motion.

The present invention thus has as purpose to provide a non-acoustic alarm of simple conception capable of equipping information supplying devices such as a timepiece without necessitating substantial modification of the structure thereof and capable of being formed at the lowest possible cost by high speed automatic operations.

SUMMARY OF THE INVENTION

To this effect, the invention has as objective a non-acoustic alarm intended to equip a device supplying information such as time information, including motor means which can be electrically driven and which are associated with a mass adapted to be set in motion under the action of the motor means in order to furnish a vibratory effect, characterized in that the motor means are constituted by an electromagnetic motor fixedly mounted on a support including elastic coupling elements which are associated with said mass which is designed to assume a quasi-linear oscillating motion relative to the electromagnetic motor when the motor is operated.

But other characteristics and advantages of the invention will appear better upon reading the detailed description which follows made with reference to the attached drawings which are given by way of example.

DESCRIPTION OF THE PREFERRED EMBODIMENT

Figure 1:
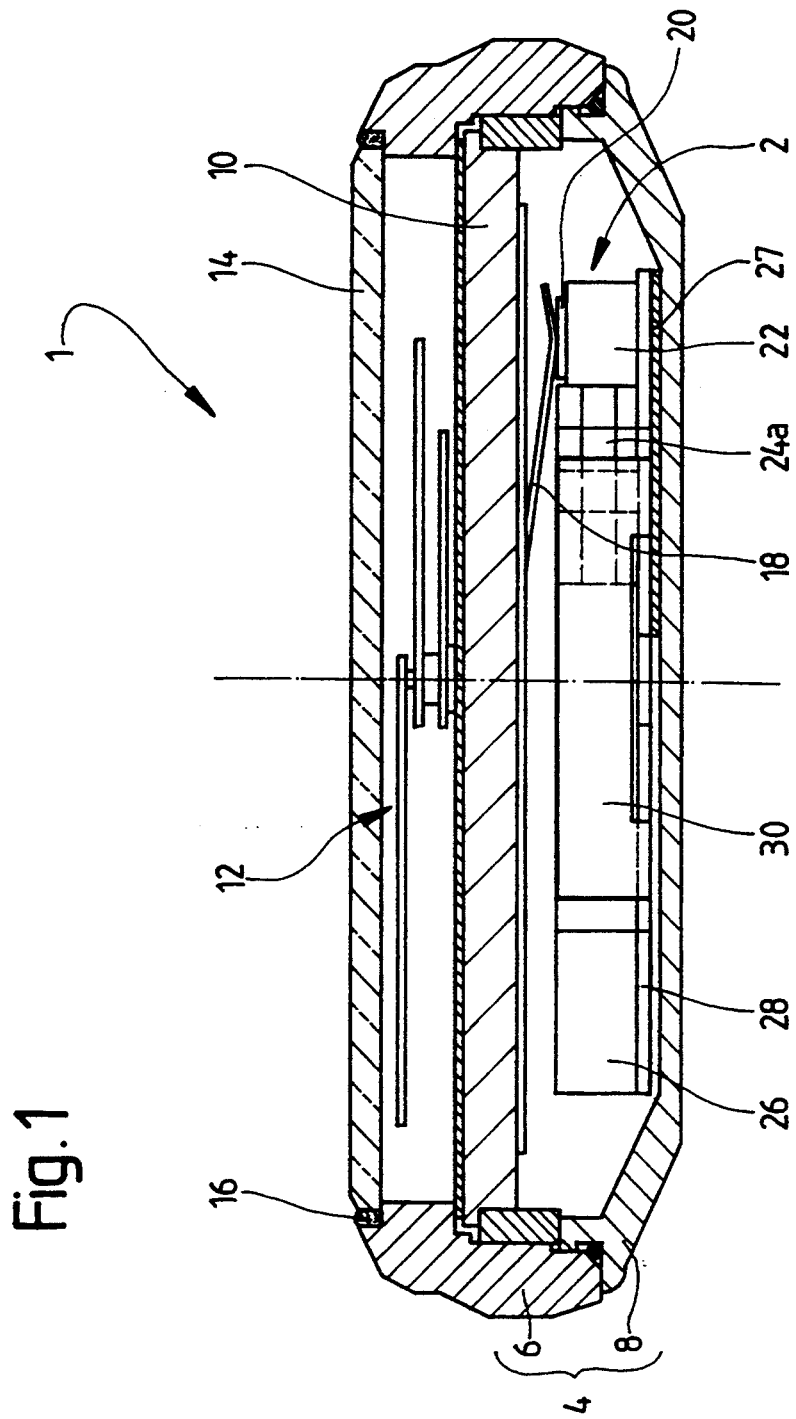
FIG. 1 shows a side view of a non-acoustic alarm according to the invention equipping a timepiece shown in cross-section.

Referring initially to FIG. 1, there will be described briefly a timepiece identified by the general reference 1 and provided with a non-acoustic alarm according to the invention, which is identified by the general reference 2.

The timepiece 1 includes a case 4 made up from a caseband 6 and a back cover 8 secured in a known manner to the caseband.

Timepiece 1 further includes an horometric movement 10 which is assembled in caseband 6 and which is designed to drive in a known manner means 12 for furnishing one or several information items, in particular time information. Means 12 are constituted by hands, respectively for hours, minutes and seconds. Such hands can provide information other than time information and they can furthermore be associated with a digital display of the opto-electronic type, here not shown.

The case is closed at the side opposite back cover 8 by a crystal 14 fitted into the caseband 6 with interposition of a watertight seal 16. The horological movement 10 includes an energy source, not shown, such as a power cell, one of the poles of which is electrically coupled to an electric contact tongue 18 which is mechanically secured to movement 10.

Such electric contact tongue 18 rests elastically on a contact stud 20 (FIG. 2) arranged on an electronic control casing 22 designed to drive the non-acoustic alarm according to the invention.

Figure 2:
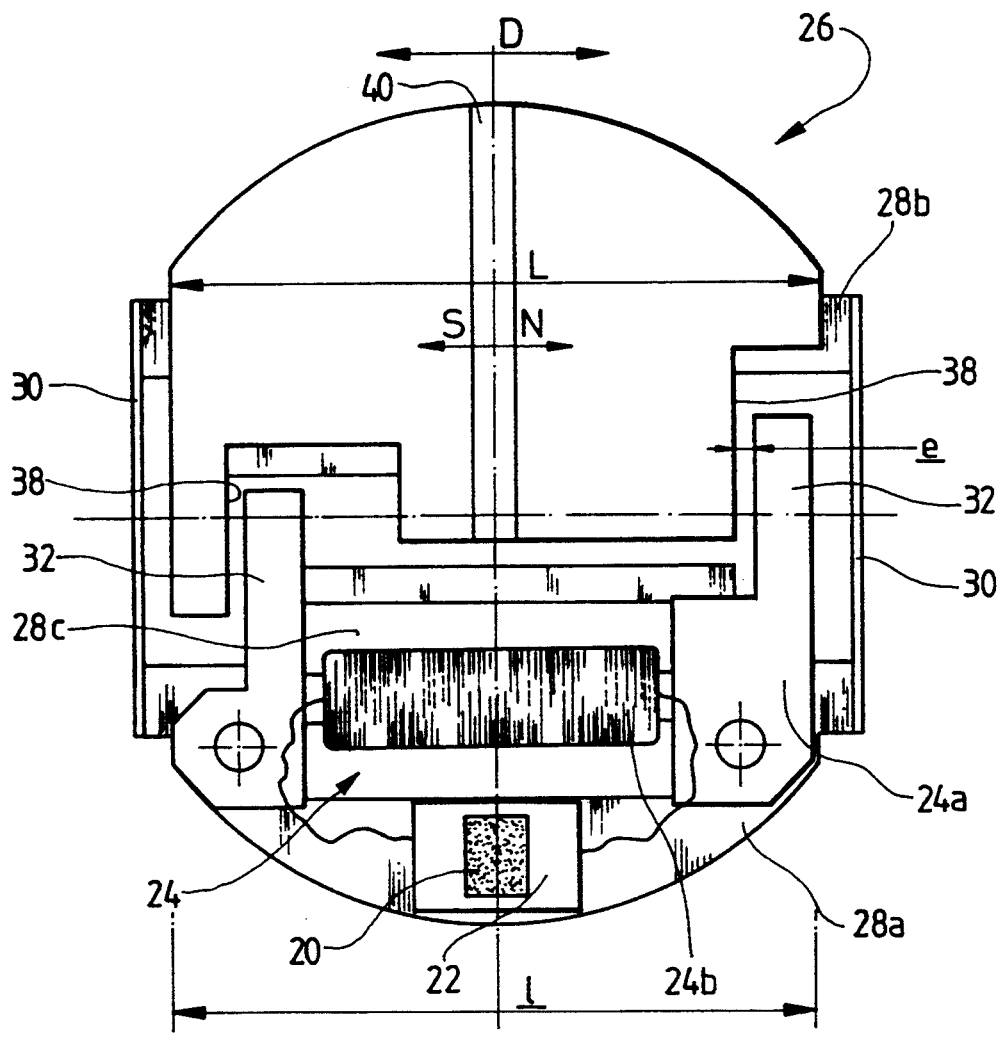
FIG. 2 is a top-view of the non-acoustic alarm according to the invention shown on FIG. 1.
Figure 3:
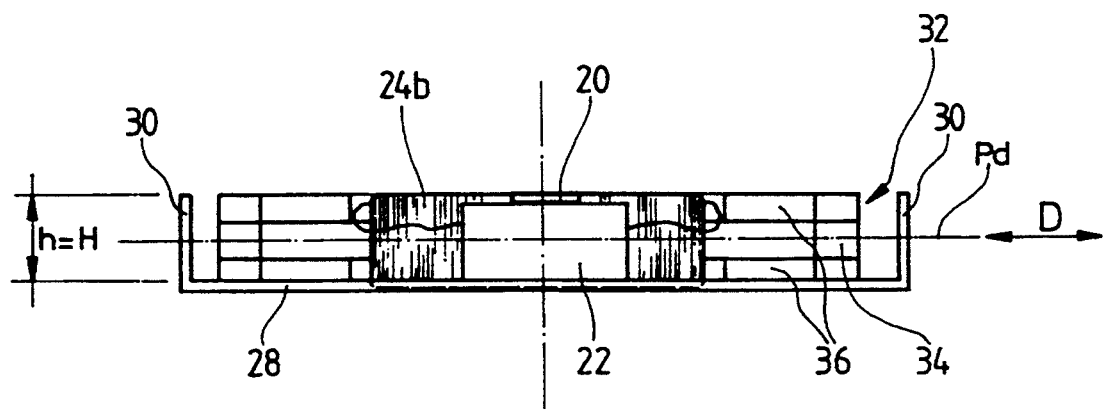
FIG. 3 is a side view of the alarm of FIG. 2.

Referring henceforth to FIGS. 2 and 3, there will be described in a more detailed manner a non-acoustic alarm 2 equipping the timepiece 1.

The non-acoustic alarm 2 includes motor means 24 which can be electrically driven from the electronic control casing 22 and which are associated with a mass 26 which, as will be understood hereinafter, can be set into motion to provide, under the action of motor means 24, a vibratory effect perceptible by the user through back cover 8 of the case 4 belonging to the timepiece 1 according to the invention.

The motor means 24 includes a core 24a and winding 24b wound in a known manner around the core 24a.

Figure 4:
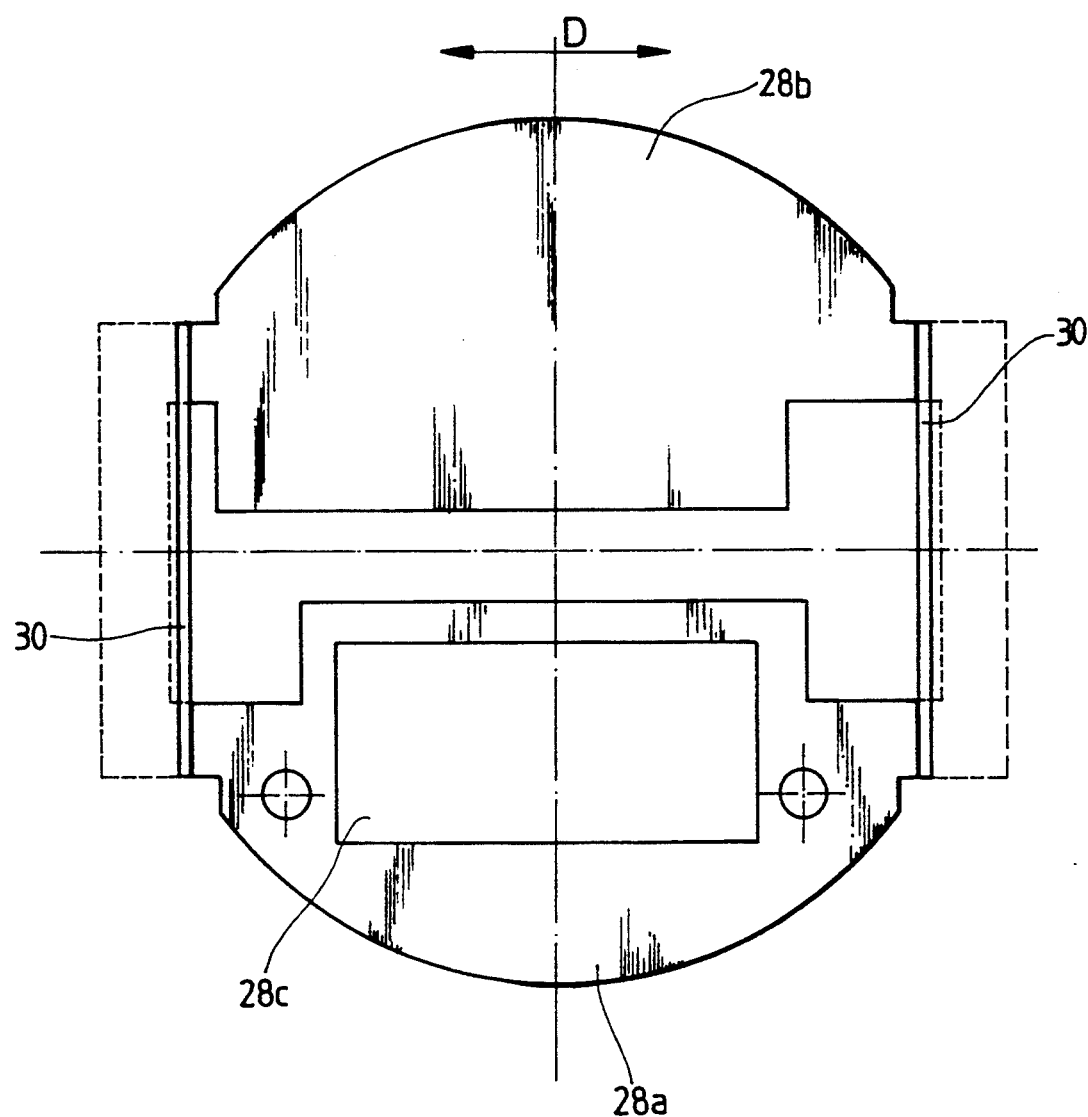
FIG. 4 is a top view of a support with which the alarm of FIGS. 1 to 3 is provided.

In an advantageous manner, the motor means 24 are thus constituted by an electromagnetic motor 24a, 24b which is fixedly mounted on a support 28 shown in a more detailed fashion in top view on FIG. 4.

Support 28 is a single multifunction piece which includes a fixed portion 28a (FIGS. 2 and 4) and on which is fixedly mounted in the final assembly the electromagnetic motor 24 and in particular core 24a as well as the electronic control casing 22.

Support 28 further includes a moving portion 28b on which mass 26 is fixedly mounted. Here it will be specified that the electromagnetic motor 24 and, in particular, its winding core 24a as well as the mass 26 are secured to support 28 and, in particular, to fixed and moving portions 28a, 28b, respectively by electric welding securing means referred to as spot welding. Here it will be furthermore specified that the winding core 24a, mass 26 and support 28 are stamped pieces obtained by cold deformation and which can thus be formed in large quantities by industrial manufacturing techniques at high speed; the assembly of such elements, which are of simple conception, can be carried out in an automated fashion.

The fixed portion 28 is furthermore intended to be secured by screwing or gluing to back cover 8 of the timepiece 1 with interposition of a spacer 27 in order to avoid that the moving portion 28b rub against back cover 8 when it is set into motion.

As is to be noted on FIGS. 2 to 4, the two respectively fixed and moving portions 28a, 28b are coupled together by coupling elements 30 which are constituted by blades or foils integral with the two portions 28a and 28b and which are formed at the same time as the latter in their thickness by the same stamping operations. There has been shown by broken lines on FIG. 4 such elastic coupling elements 30 after they have been obtained by the different stamping operations and before they are bent and folded in order to extend perpendicularly to the portions 28a and 28b. As will be understood by what follows, the arrangement of such elastic coupling elements 30 and their orientation relative to the respectively fixed and moving portions 28a, 28b enables a lateral displacement substantially in translation of the moving portion 28b relative to the fixed portion 28a as shown by arrow D on FIGS. 2 to 4.

The fixed portion 28a further includes a central cut-out 28c which is intended to receive winding 24b of the electromagnetic motor 24.

As is understood and as clearly apparent from FIGS. 2, 3 and 4, the support 28 is formed of one piece in a flat sheet, for example metallic, of small thickness and the elastic tongues 30 which are integral with both the fixed 28a and moving portions 28b do not exhibit any added mechanical attachment either with mass 26 or with motor 24. The support 28 thus constitutes a flat multifunctional securing stirrup or cradle of very small thickness assuring securing of the alarm components 2 on the back cover of a watch case and their relative positioning, with a return elastic movement of the mass relative to the motor.

In referring hereinafter to FIGS. 2 and 3, it will be noted that the core of winding 24a includes two arms 32 which extend towards mass 26 parallel to the elastic coupling elements 30 of support 28. Each arm 32 is formed by a stack of three pieces obtained respectively by stamping of which the one in the center referenced 34 constitutes the core of the winding as such in traversing winding 24b and in being in common with the opposite arm, while the other two parts both referenced 36, are assembled on either side of the intermediate piece 34 and are attached to the latter for example by welding or gluing.

Arms 32 constitute polar expansions which extend facing corresponding polar surfaces referenced 38, arranged on mass 26 and extending likewise parallel to the two arms 32 as well as parallel to the elastic coupling elements 30. Here it will be noted that the two polar surfaces 38 of the mass 26 are arranged on the same side (at the left on FIG. 2) relative to the corresponding arms 32.

The polar surfaces 38 are formed by appropriate blanking or cutting operations of mass 26, obtained by the stamping operations leading to the manufacture of such mass.

Between mass 26 and the arms 32 which form the polar expansions of the core of winding 24a are arranged gaps e which likewise extend parallel to the elastic coupling elements 30.

In the embodiment shown, mass 26 further includes a permanent magnet 40 which extends in the direction of the length of alarm 2, that is to say parallel to the elastic coupling elements 30 and in a manner normal to the direction of displacement D of mass 26.

The permanent magnet 40 exhibits a permanent magnetization axis North-South (indicated by the arrow S-N) which is oriented in a manner parallel to the direction of displacement D of mass 26.

In an embodiment, not shown, the magnet 40 can be omitted.

It will be further specified that mass 26 extends over a height H (FIG. 3) equal to the height h of the polar arms 32. Thus, gaps e are formed having an optimum surface which assures a high yield of the motor 24. It is understood that under the control of the electronic control casing 22 the winding can be energized electrically and give rise to a magnetic flux which can circulate within the core of winding 24a and can be closed in passing through mass 26 via gaps e. Also, under such electrical energization, which in the embodiment described is of the alternating type, mass 26 approaches the polar arms 32 and places the elastic coupling elements 30 under stress. Then, mass 26 is brought back to its initial position and so continuing in order to oscillate around such position in a lateral back and forth motion. Consequently, by choosing the appropriate form of energization as far as frequency and amplitude is concerned, a vibratory effect is created in the case of the timepiece 1 thanks to displacement of mass 26, which has at the same time a function of vibrating mass and magnetic shunt in the electromagnetic circuit of the non-acoustic alarm 2. It will be noted that the displacement of mass 26 is a quasi-linear oscillating displacement which is produced in a displacement plane Pd in which the displacement direction D of mass 26 extends.

It will be noted that the quasi-totality of the components of the non-acoustic alarm 2 extend in the displacement plane P; the mass 26 being in effect arranged in the same plane as that in which the winding 24b as well as the core 24a of the electromagnetic motor 24 extend. All such components are thus substantially at the same level. There is thus provided a basically planar overlapping configuration of small thickness and compact form. It is noted effectively that mass 26 exhibits a width L substantially equal to that referenced 1, of the electromagnetic motor 24.

It will be here specified that the timepiece 1 can furthermore include or constitute a call receiving apparatus (or pager) or another arrangement for furnishing information.

For the rest it is noted that the non-acoustic alarm according to the invention is particularly well suited to an horological application since its basically planar form of small thickness enables easy integration into a watch case without major modification of the other components. Here it will be specified that FIG. 1 is not a representation to scale, the non-acoustic alarm having been shown in an enlarged manner to facilitate reading of the drawings. Solely by way of indication, a non-acoustic alarm of this type has been formed with an overall height of about 1.5 mm.

What is claimed is:

1. A non-acoustic alarm for a device supplying information such as time information, said alarm comprising motor means which can be electrically driven and which is associated with a mass adapted to be set in motion under the action of the motor means in order to furnish a vibratory effect, the motor means including an electromagnetic motor fixedly mounted on support means comprising elastic coupling elements which are associated with said mass and cause said mass to assume a quasi-linear oscillating motion relative to the electromagnetic motor when the motor is operated.

2. An alarm as set forth in claim 1, wherein said support means is a single multifunctional piece having the form of a stirrup including a fixed portion on which said motor is mounted and a movable portion on which said mass is mounted, the two respectively fixed and movable portions being coupled together by the elastic coupling elements which are constituted by bent blades integral with said fixed and movable portions.

3. An alarm as set forth in claim 1, wherein said electromagnetic motor includes a winding and a core supporting the winding, the core including two arms which extend parallel to the elastic coupling elements of the support means and which form two pole pieces providing a gap with corresponding surfaces of the mass.

4. An alarm as set forth in claim 3, wherein the mass is a piece having a substantially planar form extending over the entire width of the core and a height substantially equal to that of the motor.

5. An alarm as set forth in claim 3, wherein the support means, the core and the mass are constituted by stamped parts.

6. An alarm as set forth in claim 5, wherein the core and the mass are welded to the support means.

7. An alarm as set forth in claim 1, wherein the support means is formed from a metallic sheet.

8. An alarm as set forth in claim 2, wherein said electromagnetic motor includes a winding and a core supporting the winding, the core including two arms which extend parallel to the elastic coupling elements of the support means and which form two pole pieces providing a gap with corresponding surfaces of the mass.

9. An alarm as set forth in claim 8, wherein the mass is a piece having a substantially planar form extending over the entire width of the core and a height substantially equal to that of the motor.

10. An alarm as set forth in claim 9, wherein the support means, the core and the mass are constituted by stamped parts.

11. An alarm as set forth in claim 10, wherein the core and the mass are welded to the support means.

12. An alarm as set forth in claim 11, wherein the support means is formed from a metallic sheet.

13. An alarm as set forth in claim 8, wherein the support means, the core and the mass are constituted by stamped parts.

14. An alarm as set forth in claim 13, wherein the core and the mass are welded to the support means.

15. An alarm as set forth in claim 14, wherein the support means is formed from a metallic sheet.

16. An alarm as set forth in claim 2, wherein the support means is formed from a metallic sheet.

17. An alarm as set forth in claim 5, wherein the support means is formed from a metallic sheet.

* * * * *